(12) United States Patent
Valdez (10) Patent No.: US 8,839,281 B2
(45) Date of Patent: Sep. 16, 2014

(54) ANALYZING MEDIA CONTENT INTERACTION

(75) Inventor: John Valdez, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 540 days.

(21) Appl. No.: 12/464,503

(22) Filed: May 12, 2009

(65) Prior Publication Data

US 2010/0293566 A1 Nov. 18, 2010

(51) Int. Cl.
| | |
|---|---|
| H04H 60/32 | (2008.01) |
| H04H 20/14 | (2008.01) |
| H04N 21/658 | (2011.01) |
| H04N 21/258 | (2011.01) |
| H04N 7/173 | (2011.01) |
| H04N 21/8352 | (2011.01) |
| H04H 60/33 | (2008.01) |
| H04N 21/442 | (2011.01) |
| H04N 21/81 | (2011.01) |
| H04N 21/6543 | (2011.01) |
| G06Q 30/02 | (2012.01) |
| H04H 60/37 | (2008.01) |
| H04H 60/45 | (2008.01) |

(52) U.S. Cl.
CPC .............. *H04N 7/173* (2013.01); *H04H 20/14* (2013.01); *H04H 60/45* (2013.01); *H04N 21/6582* (2013.01); *H04N 21/25891* (2013.01); *H04N 21/8352* (2013.01); *H04H 60/33* (2013.01); *H04N 21/44222* (2013.01); *H04N 21/812* (2013.01); *H04N 21/6543* (2013.01); *G06Q 30/02* (2013.01); *H04H 60/37* (2013.01)
USPC ................................................ 725/14; 725/19

(58) Field of Classification Search
None
See application file for complete search history.

(56) References Cited

U.S. PATENT DOCUMENTS

| | | | | |
|---|---|---|---|---|
| 2006/0015902 | A1* | 1/2006 | Matsuura et al. ............... | 725/46 |
| 2007/0157249 | A1* | 7/2007 | Cordray et al. .................. | 725/58 |
| 2007/0266031 | A1* | 11/2007 | Adams et al. .................... | 707/10 |
| 2008/0092156 | A1* | 4/2008 | Ferrone .......................... | 725/13 |
| 2008/0188209 | A1* | 8/2008 | Dorogusker et al. ....... | 455/414.2 |
| 2010/0071013 | A1* | 3/2010 | Vandermolen et al. ........ | 725/109 |

* cited by examiner

*Primary Examiner* — Brian T Pendleton
*Assistant Examiner* — Jean D Saint Cyr (57) ABSTRACT

A method includes receiving a transport stream, the transport stream including a content identifier associated with an instance of media content. The method further includes receiving a monitoring request that specifies at least one instance of media content. The method further includes determining if the specified instance of media content is currently being experienced by a user. If the specified instance of media content is currently being experienced by a user, then the method includes developing a set of interaction data by analyzing the user's interaction with the specified instance of media content in part by monitoring commands received from a control device, and providing the set of interaction data to another device.

30 Claims, 4 Drawing Sheets

ANALYZING MEDIA CONTENT INTERACTION

BACKGROUND

Many media content processing devices, such as a television set-top box (STB), allow a user to buffer media broadcasts. Typically, received media content is stored in memory, allowing a user to pause, rewind, and fast forward streaming media content. In addition, many STBs include personal video recorders (PVRs) that allow a user to record media content for later playback, and also allow a user to fast-forward through the recorded content.

The ability to buffer broadcast media content is impacting the advertising industry. In the past broadcast programming such as television programming has been subsidized by the insertion of promotional (e.g., advertising) messages such as commercials into the programming. Today, many users fast-forward through promotional messages using their PVR. Yet, despite such activity attempts have been made to measure how many people watch a particular show, even if the viewing is time-shifted. However, advertisers do not have a mechanism for determining how many users actually view a particular promotional message provided during a specific show. In addition, advertisers do not have a mechanism for determining the demographic of those viewers who either watched or skipped a particular message. Such information could be used by advertisers to understand the effectiveness of their promotional or advertising campaigns, and to understand the value of a particular promotional message. Further, such information could assist an advertiser in selecting a more appropriate target demographic based on those viewers who actually watched each message.

DETAILED DESCRIPTION

Figure 1:
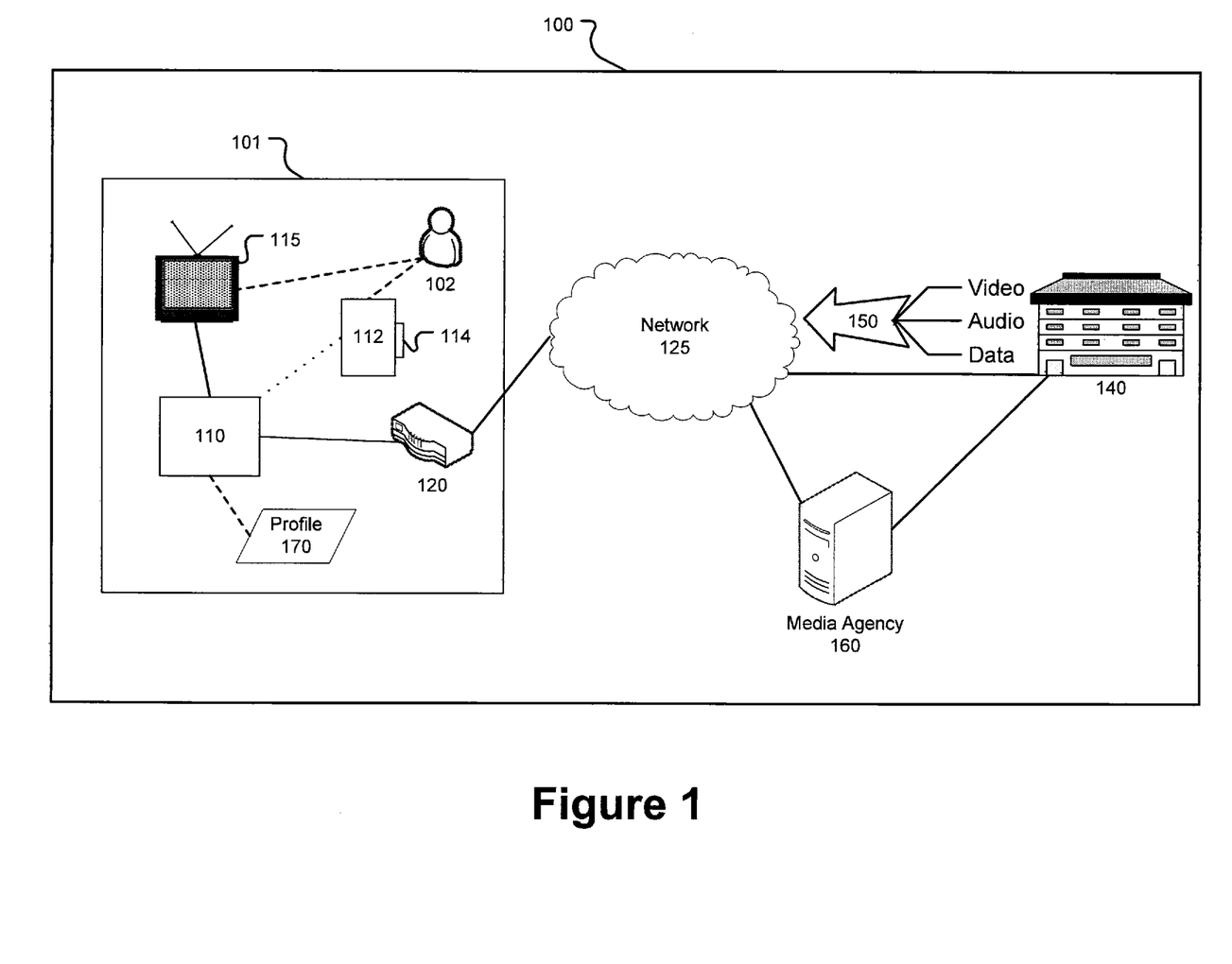
FIG. 1 illustrates an exemplary system for analyzing media content interaction.

FIG. 1 illustrates an exemplary system 100 for analyzing how a user 102 interacts with a transport stream 150. For example, system 100 is configured to determine whether user 102 views or skips a particular instance of media content, such as a promotional message (e.g., commercial). System 100 is capable of monitoring such interaction activity with respect to numerous instances of media content, for example, by monitoring all or a selected group of promotional messages. Further, system 100 is configured to receive a request from a source or interested party, such as a media agency 100, and provide interaction data with respect to selected instances of media content. For example, an advertiser may send a request for interaction data concerning how a user interacted with that advertiser's commercial. Further, system 100 is configured to correlate a user profile with user 102 to determine the particular demographic of user 102. Thus, system 100 can include demographic data with the interaction data to inform an interested party of how different demographic groups interacted with a particular instance of media content.

As illustrated in FIG. 1, a content provider 140 provides media content to a customer premises 101. Customer premises 101 may be a home, business, or any other location that receives a streaming media signal, also referred to as a transport stream 150. Transport stream 150 typically includes multiple multiplexed signals, including a video signal, an audio signal, and a data signal. The data signal includes a multitude of data and instructions, including timing information, commercial insertion information (such as directed channel changes), and content identifiers associated with one or more instances of media content. An instance of media content is typically one audiovisual work, such as a television show, a movie, a news broadcast, or a promotional message (e.g., an advertising message, a commercial, an infomercial, or a public service broadcast/announcement).

Transport stream 150 typically includes numerous channels with many instances of media content, such as television shows, movies, commercials, infomercials, etc. Transport steam 150 is provided via one or more networks 125, and is received by a content processing device 110, possibly via one or more routers 120 or other networking devices. For example, system 100 may include a broadband home router (BHR) that connects content processing device 110 to network 125.

Content processing device 110 provides media content to a user 102 via a media player 115, such as a television. User 102 typically interacts with content processing device 110 using a control device such as remote control 112. System 100 is configured to facilitate bi-directional communication between content processing device 110 and other devices, such as content provider 140 and media agency 160. For example, content processing device 110 typically allows user 102 to access various interactive services, such as video-on-demand (VOD), games, Internet browsing, etc.

Content processing device 110 is generally a specialized device, e.g., a set top box (STB) or similar device, for requesting and receiving media content from a media content provider 140 via network 125. Content processing device 110 also provides the received media content to a media player 115. Content processing device 110 generally includes a processor and a memory, and may be provided with a proprietary or specialized operating system, embedded software, or the like. For example, content processing device 110 may be an STB provided with a real time operating system (RTOS). However, it is to be understood that the role generally ascribed to content processing device 110 may be filled by a computing device such as a computer, a mobile device, a cellular telephone, a personal digital assistant, etc., so long as the device is capable of requesting and receiving media content from content provider 140 via network 125, and is capable of storing and executing such program instructions as may be stored on a computer-readable medium. For example, content processing device 110 may also be a digital video recorder (DVR), a personal video recorder (PVR), a video game console, a cellular phone, a computer, a hand-held video player, a television, or any similar mechanism.

Content processing device 110 also includes one or more hardware and/or software components for buffering media content. For example, content processing device 110 may be configured to allow user 102 to pause, rewind, and fast-forward through buffered media content received from transport stream 150. In addition, content processing device 110 may include digital recording capabilities, for example, by including a digital video recorder (DVR) or personal video recorder (PVR), thereby also allowing a user to record and store media content received from content provider 140. In addition, content processing device 110 may be configured to determine whether a particular instance of media content was experienced in normal play mode or skipped. For example, content processing device 110 may determine that a commercial was skipped, and thus not experienced, if user 102 fast-forwards through a majority of the commercial.

Content processing device 110 may also include hardware and/or software for associating user 102 with a profile 170, thereby distinguishing one person from another. Content processing device 110 may also be configured to distinguish a demographic of one user from a demographic of another user without using any personally identifying information about user 102. For example, content processing device 110 may associate user 102 with a particular demographic based on the selected media content, a profile selected by user 102, or some other input data. For example, content processing device 110 may use data provided by remote control 112 to distinguish one user from another, to associate a user 102 with a profile 170, and to correlate a user 102 with one or more demographics.

Profile 170 may be associated with a customer premises 101, a user 102, and/or a content processing device 110. Accordingly, profile 170 may be associated in a database with at least one of a user identifier, a content processing device identifier, a customer premises identifier, etc. Further, profile 170 may include, for example, information identifying one or more subscription-based services, channels, features, etc. In addition, profile 170 may include personalization settings, media access restrictions, records of accessed media content, etc. System 100 may also be configured such that a user's interaction data is stored in profile 170. For example, profile 170 may maintain records relating to whether a user 102 experienced or fast-forwarded through a particular instance of media content. Additional information stored in a profile may include a content identifier, a genre, a category, the time the media content was accessed (particular for previously recorded content), an associated instances of media content, and any other associated data, such as data received in transport stream 150. While illustrated in FIG. 1 as being associated with content processing device 110, it should be noted that profile 170 can be stored in any computing device in system 100, including content provider 140.

User 102 typically interacts with content processing device 110 using a remote control 112. In one possible aspect, remote control 112 may be a hand held mechanism that can wirelessly communicate with content processing device 110 using infrared (IR) and/or radio frequency (RF) communications. In another possible aspect, remote control 112 may also be a wired or wireless keyboard or gamepad or another Human Interface Device (HID) as is known, including personal computers. User 102 may utilize remote control 112 to select media content channels, access various menus and optional settings, select a profile, and manipulate the play mode of media content. For example, user 102 may use remote control 112 to change the play mode from a normal play mode to fast-forward, rewind, pause, skip, or any other play mode. For example, remote control 112 allows user 102 to skip all or a portion of an instance of media content, such as by fast-forwarding through a commercial.

Remote control 112 may include one or more sensors 114 that can be used to distinguish one user from another. For example, sensor 114 may be a biometric sensor, such as a fingerprint scanner, that can be used to distinguish one user from another. Further, sensor 114 may be a pH sensor that can distinguish one user from another based on an acidity level of a user's skin. In addition, sensor 114 may be a motion sensor, a proximity sensor, or a touch-sensitive sensor to determine whether user 102 is in contact or in proximity of remote control 112. Typically, sensor 114 may be used to determine if user 102 is currently viewing media player 115.

Media player 115 receives media content from content processing device 110, and plays such media content so that it can be perceived by user 102. Media player 115 may be a television receiver, such as is known, including a television or a high definition television (HDTV). Further, it is possible, and in many cases likely, that operations ascribed herein to content processing device 110 and media player 115 may all or mostly be performed by a computing device, whereby media player 115 and/or content processing device 110 may be replaced by one or more computing devices.

Network 125 typically includes one or more networks and/or communication links. For example, network 125 can be a media distribution network for providing media content to a customer premises 101. Network 125 may include hardware and software for providing transport stream 150 via a coaxial cable, a fiber optic cable, or via one or more wireless transmission systems, such a satellite distribution system. Network 125 can be a packet switched network, which is generally an internet protocol (IP) network that utilizes one or more protocols found generally within the Internet protocol suite. Further, network 125 may include a variety of networks such as a wide area network (WAN), e.g., the Internet, a local area network (LAN), a fiber-optic network, asynchronous transfer mode (ATM) networks, etc. Of course, network 125 may be a hybrid fiber-coaxial (HFC) system, a fiber to the x (FTTX) system, or some other network for delivering transport stream 150 to customer premises 101. In one example, content provider provides transport stream 150 via a wireless system, such as satellite, and content processing device 110 communicates data back to content provider 140 via network 125, such as over the Internet or over a telephone connection.

Transport stream 150 is typically provided according to one or more standards. In North America, most media content providers 140 operate using the ATSC standards provided by Advanced Television Systems Committee, Inc. of Washington, D.C. While the following provides examples with respect to the various ATSC standards, the disclosed systems and methods can be utilized with respect to other standards as well, including the DVB (Digital Video Broadcasting) standards, and the ISDB (Integrated Services Digital Broadcasting) standards. As illustrated in FIG. 1, transport stream 150 typically includes several components, including audio, video, and data. The data component includes a vast amount of data and instructions, and also includes a content identifier.

Each instance of media content is typically associated with one or more content identifiers. System 100 analyzes how a user interacts with a specific instance of media content by correlating a user's actions with a content identifier. Such interaction data can be requested by and sent to a media agency 160, such as an advertising center, a licensing agency, a broadcaster, a ratings agency, or any other interested party. Media agency 160 may include a networked computing system capable of communicating with one or more systems or devices in system 100. For example, media agency 160 may be configured to communicate with content processing device 110 via network 125. Media agency 160 also may be configured to communicate with content provider 140 via network 125 or directly. Media agency 160 may request interaction data associated with one or more instances of media content. Further, media agency 160 may maintain one or more databases or tables that associate a content identifier with a particular instance of media content.

A content identifier may be an ISAN (International Standard Audiovisual Number) as defined in ISO 15706-2. Further, a content identifier may be an ATSC content identifier, or any other identifier used to distinguish one instance of media content from another. Use of such content identifiers is discussed in detail in ATSC A/57B entitled "Content Identification and Labeling for ATSC Transport." As discussed in ATSC A/57B, such content identifiers may be provided at the beginning of an instance of media content, such as a television show or commercial, or may be provided intermittently during the entire instance of media content, including during random intervals. For example, a content identifier may be provided in one or more data tables according to the Program and System Information Protocol (PSIP), as defined in ATSC A/65C entitled "Program and System Information Protocol for Terrestrial Broadcast and Cable." The PSIP protocol defines a series of tables, including a Rating Region Table (RRT), Event Information Tables (EIT), and Extended Text Tables (ETT). As discussed in ATSC A/57B, a content identifier is typically metadata for a PSIP event, and can be provided periodically in association with the Event Information Tables (EIT). A content identifier may also be a "house" or proprietary number whereby a party, such as media agency 160, maintains a proprietary table or database coordinating instances of media content with their content identifiers.

Figure 2:
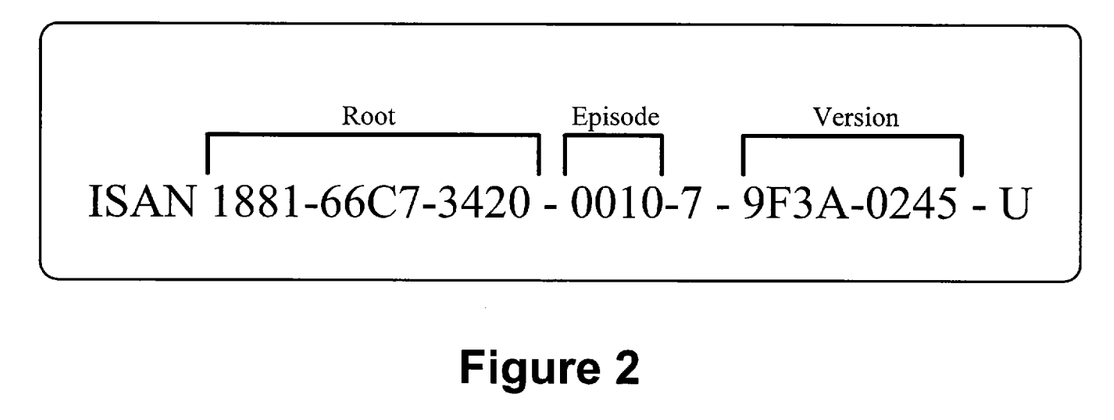
FIG. 2 illustrates an exemplary media content identifier.

FIG. 2 illustrates an example of a content identifier shown as an ISAN. An ISAN is a 96-bit number that includes three segments: a root, an episode or part, and a version. A root is typically assigned to a main audiovisual work, such as a movie, television program, or commercial. A root may also be used to identify media agency 160, such as an advertising agency, a particular advertiser, or some other entity. For example, an advertising agency may create advertising campaigns and promotional messages for numerous advertisers, and may assign each of their promotional messages with an ISAN using the same root. Thus, such an advertising agency may easily obtain interaction data using system 100 for all commercials with that ISAN root. Of course, media agency 160 may also use only a portion of the root to identify media agency 160, and use the remaining part of the root to identify an advertiser, an advertising campaign, a product line, etc. An episode refers to a specific media instance. Finally, the version relates to characteristics of the media instance, such as one selected for transmission within a predefined geographic region.

Content processing device 110 and transport stream 150 may also include additional information and such information could be demographic data. For example, transport stream 150 may include the Rating Region Table (RRT) that provides TV parental guidelines or rating information. Transport stream 150 may also include more particularized demographic data associated with a particular instance of media content. For example, transport stream 150 may provide demographic data provided by Nielsen Media Research of New York, N.Y. Further, content processing device 110 may store demographic data associated with user 102 in profile 170. For example, a customer premises may be a family household with parents and children. Content processing device 110 may associate each user 102 with a profile 170 that stores demographic data. Demographic data may include one or more of the following characteristics: age, sex, marital status, location (e.g. zip code, state, etc.), location description (i.e. urban, rural, etc.), as well as other appropriate characteristics. Further, as previously discussed, content processing device 110 may determine such demographic data without using or providing any personally identifying information, such as information that can identify a person's name or address.

Figure 3:
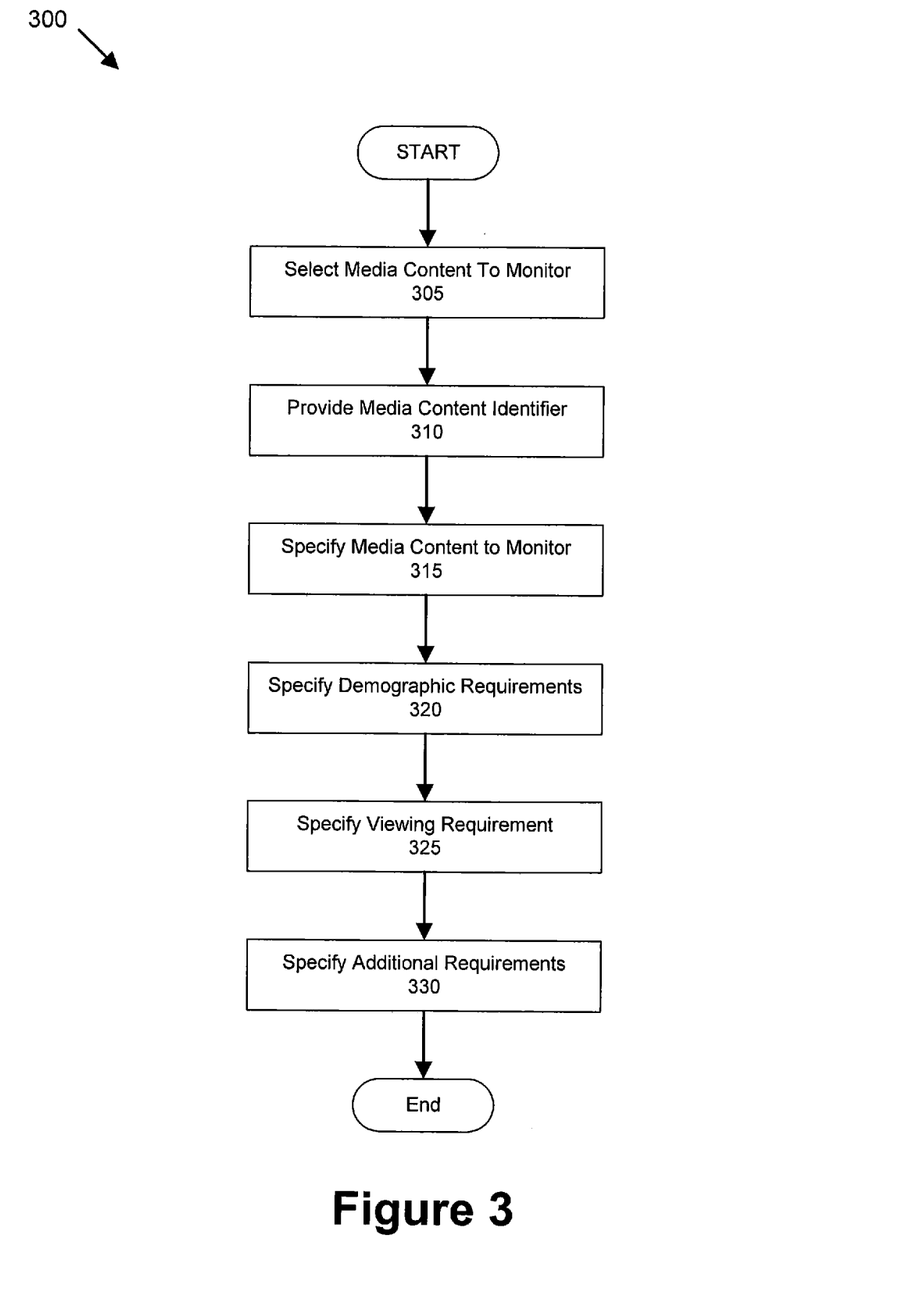
FIG. 3 illustrates an exemplary process for preparing a monitoring request.

FIG. 3 illustrates an exemplary process 300 for preparing a monitoring request. Generally, a monitoring request is a request for user interaction data. Typically, the monitoring request specifies which instances of media content to analyze, and sets certain parameters on monitoring and analyzing interaction data associated with the specified media content. Once prepared, a monitoring request can be provided to one or more content processing devices 110, typically from content provider 140 or media agency 160.

The following describes media agency 160 preparing a monitoring request. However, a monitoring request may be prepared by any group or system, including content provider 140. For example, media agency 160 may provide information to content provider 140, and content provider 140 can prepare a monitoring request. Content provider 140 may provide a graphical user website that allows an interested party, such as an advertiser, to submit data that content provider 140 can then transform into a monitoring request.

Process 300 begins in step 305 by media agency 160 selecting media content to monitor. Such media content may be one or more television shows, commercials, infomercials, public service announcements, etc. An advertising agency, for example, may choose to monitor all of their own commercials, commercials for a particular product or company, or commercials tied to an advertising campaign.

Next, in step 310, each selected instance of media content is provided with a media content identifier, such as an ISAN. A media content identifier can be selected, formatted, and inserted into each instance of media content by content provider 140 or media agency 160. For example, media agency 160 may produce the media content, and thus can incorporate a media content identifier before the media content is sent to content provider 140. Further, content provider 140 may include a content identifier in the data portion of transport stream 150 before the media content is delivered to a content processing device 110. For example, content provider 110 may insert a content identifier into a table in the PSIP in transport stream 150.

Next, in step 315, media agency 160 specifies which media content to monitor. The media content to be monitored may be specified individually by a content identifier. However, a requester may wish to monitor many instances of media content. Thus, the monitored media content may be specified by a part of a content identifier, such as a root of an ISAN, or part of a root of an ISAN. A part of a content identifier may identify media agency 160, for example.

Next, in step 320, media agency 160 specifies any desired demographic requirements. For example, as previously discussed, content processing device 110 may associate user 102 with one or more demographic categories, such as age, sex, location, etc. Such demographic data may be gathered using profile 170, data within transport stream 170, etc. A requestor of interaction data, such as media agency 160, may specify that interaction data is only requested for a group of people, or may exclude one or more demographic groups. Any demographic requirements or restrictions can be specified in the monitoring request.

Next, in step 325, media agency 160 specifies viewing requirements. A viewing requirement can be a set of criteria that determines what constitutes a threshold likelihood or probability as to whether user 102 experienced or skipped an instance of media content. For example, media agency 160 may consider anyone who experienced half of a commercial in normal play mode as having experienced the commercial. However, another media agency 160 may specify that only a user who watched an entire commercial in normal play mode will be considered to have experienced the commercial. As the length and type of media content varies substantially, viewing requirements allow a requester to develop their own criteria as for what constitutes a user having experienced or skipped the specified instance of media content.

Next, in step 330, media agency 160 specifies any additional requirements or criteria for the monitoring request. For example, the monitoring request may exclude all data for users receiving transport stream 150 "live," as in not buffered, as a user 102 cannot fast-forward or skip media content that is streaming live. Further, another requirement may time related, such as a time of day, a day of the week, a time window (i.e. a week or month), etc. For example, a requester may be testing a new commercial and only want interaction data for a day or a week. Another request for interaction data may be long-term, and specify that the specified media content should be monitored indefinitely. A criteria may also relate to a media channel. For example, an interested party may attempt to identify which media channels receive the most views of a particular commercial, and thus request to limit or identify a channel in the monitoring request. Another criteria in the monitoring request may be a request for additional data. For example, additional data may include the channel where the instance of media content was experienced, a time of day, etc. An additional requirement could also include a charge or fee limit. As one exemplary illustration, content provider 140 could charge fees for allowing an interested party to monitor and analyze interaction data. In addition, such fees may be based on any number of factors, including time, a number of content processing devices 110 being monitored, an amount per requirement (e.g. demographic limitations, etc.). Thus, a requester may set a limit on an amount of fees to incur.

Following process 300, an entity such as content provider 140 or media agency 160 will have prepared a monitoring request to monitor and analyze interaction data for one or more instances of media content. The monitoring request can then be sent to one or more content processing devices 110. Content processing device 110 can then monitor a user's interaction with select instances of media content according to the requirements set forth in the monitoring request. In another example, a monitoring request may first be received by content provider 140, who interprets the monitoring request and configures one or more content processing devices 110 according to the specifications in the monitoring request. Content provider 140 may receive a monitoring request from media agency 160, select one or more content processing devices 110 to receive the monitoring request, and then send the monitoring request to the selected content processing devices 110.

Figure 4:
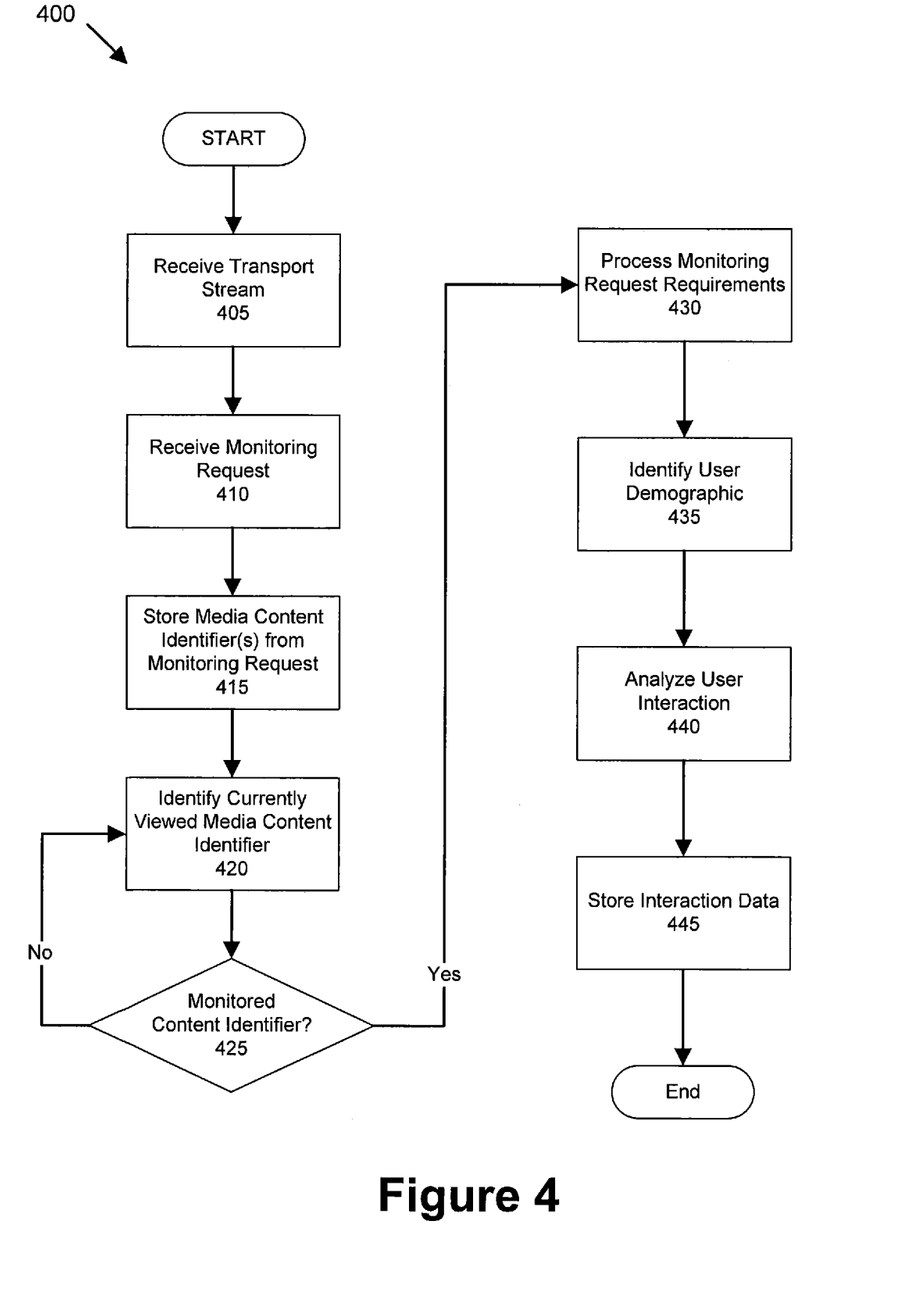
FIG. 4 illustrates an exemplary process for analyzing media content interaction.

FIG. 4 illustrates an exemplary process 400 for analyzing media content interaction. Content processing device 110 monitors transport stream 150 and actions taken by user 102 to analyze and generate interaction data. Process 400 begins in step 405 when content processing device 110 receives transport stream 150. As previously discussed, transport stream 150 may include multiple channels, different instances of media content, data, etc.

Next, in step 410, content processing device 110 receives a monitoring request. Typically, a monitoring request is received via network 125, and may be received via transport stream 150. For example, content provider 140 may provide the monitoring request via transport stream 150 over a wireless connection, such as by satellite. Content processing device 110 may be capable of communicating with various devices via a packet switched network and may receive a monitoring request as packet data.

Next, in step 415, content processing device 110 stores one or more media content identifiers from the monitoring request. As previously discussed, the monitoring request specifies which instances of media content to monitor by specifying one or more media content identifiers. Further, a monitoring request may specify part of a media content identifier, such as a root of an ISAN. Content processing device 110 then stores the media content identifier(s) or partial identifier in order to identify the instances of media content to monitor.

Next, in step 420, content processing device 110 identifies the media content identifier of the currently experienced media content. User 102 may be viewing "live" media content delivered in transport stream 150, may be watching buffered content, or may be viewing content previously recorded on a PVR or DVR. Content processing device 110 then identifies the media content identifier of the currently experienced media content.

Next, in step 425, content processing device 110 determines if the currently experienced media content should be monitored. Generally, content processing device 110 compares the stored media content identifiers from a monitoring request to the media content identifier in the currently experienced media content. As previously discussed, a monitoring request may also identify instances of media content by part of a media content identifier, such as a root of an ISAN. If the currently experienced media content is not one of the instances in a monitoring request, then process 400 returns to step 420. If there is a match, then process 400 proceeds to step 430.

In step 430, content processing device 110 processes the requirements associated with a monitoring request. For example, content processing device 110 may receive and store numerous monitoring requests with various requirements. When content processing device 110 determines that one monitoring request is implicated by the currently experienced instance of media content, content processing device 110 can process the requirements associated with the implicated monitoring request. As previously discussed with respect to process 300, a monitoring request may include any number of various requirements, including time-based requirements, demographic requirements, etc. Further, a monitoring request may specify how content processing device 110 should determine whether a user experienced or skipped an instance of media content. For example, a monitoring request may identify a commercial and specify that a user "views" the commercial if the user watches at least half of the commercial in a normal play mode.

Next, in step 435, content processing device 110 may identify one or more user demographics associated with user 102. As previously discussed, content processing device 110 may utilize profile 170 to identify a demographic associated with user 102. Further, content processing device 110 may rely on data in transport stream 150.

Next, in step 440, content processing device 110 analyzes a user's interaction with the identified media content instance. In general, content processing device 110 determines whether user 102 views the instance of media content in a normal play mode, or if user 102 fast-forwards or skips through the monitored instance of media content. Content processing device 110 may make such a determination by monitoring for a change in play mode, for example, by monitoring inputs from remote control 112. When analyzing a user's interaction with an instance of media content, content processing device 110 may first determine whether a user 102 is currently viewing media player 115. For example, content processing device 110 may use sensor 114 on remote control 112, query how long since a user 102 last used remote control 112, or any other manner of determining whether user 102 is currently viewing media player 115. Further, content processing device 110 may analyze a user's interaction based on one or more requirements in a monitoring request.

Next, in step 445, content processing device 110 stores interaction data. Such interaction data may be stored in content processing device 110, content provider 140, and/or media agency 160. Interaction data may include an indication of whether user 102 experienced or skipped the monitored instance of media content. Generally, interaction data may also include any other information that may be of interest to others, such as to advertisers. For example, interaction data may include demographic data associated with user 102, content processing device 110, profile 170, etc. Further, interaction data may include a day and time when the identified instance of media content was accessed. Interaction data may also include an indication of an associated instance of media content. For example, if the monitored instance of media content is a commercial, the interaction data may identify the program during which the commercial was displayed. In addition, the stored interaction data may include a request identifier associated with a particular monitoring request, an identifier of the content processing device 110 where the interaction data was acquired, and any raw data associated with a user's activities. For example, instead of making a determination of whether a user experienced or skipped a particular instance of media content, content processing device 110 may send raw data indicating how a user interacted with the media content. For example, raw data may indicate that a user fast-forwarded through 40% of the media content.

Content processing device 110 may be further configured to communicate the interaction data to a server or database associated with content provider 140 and/or media agency 160. In one example, a content provider 140 receives a monitoring request from media agency 160. Content provider 140 then selects a plurality of content processing devices 110 based on the monitoring request. For example, the monitoring request may specify a regional commercial, and content provider 140 may then select content processing devices 110 within the region where the commercial will be aired. Content provider 140 then sends computer-readable instructions to the selected content processing devices 110, where the instructions are based on the monitoring request. For example, the instructions may include any requirements or criteria associated with the monitoring request. Content provider 140 then receives interaction data from at least a subset of the selected content processing devices 110. Content provider 140, or another entity, may then perform some statistical analysis on the received interaction data. For example, content provider 140 may analyze the received interaction data to determine which user demographic groups experienced the instance(s) of media content specified in the monitoring request. Content provider 140 can then provide the raw interaction data and/or the analyzed results back to media agency 160. Content provider 140 may also charge a fee for such service, and may charge additional fees based on a number of criteria associated in the monitoring request. Content provider 140 may associate each monitoring request with a request identifier in order to maintain various databases with interaction data associated with different monitoring requests.

CONCLUSION

Certain parts of system 100, such as content processing device 110, content provider 140, media agency 160, may include one or more computing devices and/or systems. Further, such computing devices and/or systems may employ any of a number of computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; open source UNIX-like operating systems such as the Linux family of operating systems distributed by several companies including Motorola, Inc. of Schaumberg, Ill. Further, such devices may use one or more open-source operating systems, and other real-time operating systems, such as the Versatile Real-Time Executive (VRTX) operating system distributed by Mentor Graphics, Inc. of Wilsonville, Oreg., or the VxWorks operating system, distributed by Wind River Systems of Alameda, Calif. Computing devices may include any one of a number of computing devices that are known, including, without limitation, a general purpose computer implemented on one or more integrated circuits, a special purpose media processing integrated circuit with an embedded/included processor, a computer workstation, a desktop, notebook, laptop, handheld computer, STB, or some other computing device.

Computing devices, such as content processing device 110 and other devices mentioned herein, generally are capable of executing instructions stored on a computer readable medium, such as numerous process steps discussed with respect to the disclosed processes. For example, computer-readable instructions may include instructions for performing all or part of the disclosed processes. Computer-executable instructions may be compiled or interpreted from computer programs created using a variety of known programming languages and/or technologies, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media, and may be dynamically loaded from or through a network.

A computer-readable medium includes any medium that participates in providing data (e.g., instructions), which may be read by a computer. Such a medium may take many forms, including, but not limited to, non-volatile media and volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the processes, systems, methods, heuristics, etc. described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
   a content provider that provides media content via a transport stream, the transport stream
   including a content identifier associated with an instance of media content; and
   a content processing device communicatively coupled to the content provider and configured to:
   receive the transport stream from the content provider, identify an instance of media content to monitor, wherein a decision to monitor the instance of media content is based on at least a portion of a content identifier associated with the instance of media content and based on a predefined geographic location associated with a user device; and
   wherein the content identifier includes a root, an episode and a version; and wherein the root identifies a specific advertiser and the episode represents a specific media instance;
   monitor a user interaction with the identified instance of media content, and provide a set of interaction data.

2. The system of claim 1, further comprising a source configured to prepare a monitoring request and provide the monitoring request to the content provider, and
   the content provider being further configured to:
   provide instructions to the content processing device based on the monitoring request,
   receive the set of interaction data, and
   provide at least a subset of the interaction data to the source.

3. The system of claim 1, further comprising a control device that includes at least one sensor, wherein the content processing device is further configured to monitor user interaction with the identified instance of media content at least in part by utilizing data received from the control device.

4. The system of claim 1, the content processing device being further configured to provide the set of interaction data to at least one of the content provider and a media agency.

5. The system of claim 1, wherein the instance of media content is at least one of a television show, a movie, a news broadcast, and a promotional message.

6. The system of claim 1, the content provider being further configured to provide a monitoring request to the content processing device, the monitoring request identifying at least one instance of media content to monitor and at least one monitoring criterion.

7. The system of claim 6, wherein the at least one monitoring criterion is at least one of a demographic requirement, a demographic restriction, a viewing requirement, a time frame, a request to exclude live streaming media content, a fee limit, a location, and a media channel.

8. The system of claim 1, the content processing device being further configured to determine, based on input received from a control device, an indication of whether a threshold has been met resulting in the conclusion that there was a user experience of the specified instance of media content.

9. The system of claim 8, wherein determining whether there was a user experience of the identified instance of media content is based on a viewing requirement in a monitoring request.

10. The system of claim 8, wherein determining whether there was a user experience of the identified instance of media content is based on a pre-determined percentage of the instance of media content in a normal play mode.

11. The system of claim 1, further comprising a profile including demographic data and the content processing device, wherein the set of interaction data includes at least a subset of the demographic data stored in the profile.

12. A method, comprising: receiving a transport stream, the transport stream including a content identifier associated with an instance of media content;
    receiving a monitoring request that specifies at least one instance of media content, the instance of media content being specified by at least a portion of a content identifier and wherein a decision to monitor the instance of media content is based on at least a portion of the content identifier; and based on a predefined geographic location associated with a user device; and wherein the content identifier includes a root, an episode and a version; and wherein the root identifies a specific advertiser and the episode represents a specific media instance;
    and
    if the specified instance of media content is currently undergoing a user experience, then
    developing a set of interaction data by analyzing the interaction of the user experience with the specified instance of media content in part by monitoring commands received from a control device, and
    providing the set of interaction data to another device.

13. The method of claim 12, further comprising providing the set of interaction data to a content provider, the set of interaction data further comprising at least one of a monitoring request identifier, a time of day, demographic data, a media content identifier, and an indication of whether a threshold has been met resulting in the conclusion that there was a user experience of the specified instance of media content.

14. The method of claim 12, wherein the specified instance of media content is at least one of a television show, a movie, a news broadcast, and a promotional message.

15. The method of claim 12, further comprising processing a criterion associated with the monitoring request, wherein the criterion is at least one of a demographic requirement, a demographic restriction, a viewing requirement, a time frame, a request to exclude live streaming media content, a fee limit, a location, and a media channel.

16. The method of claim 12, further comprising:
    identifying demographic data associated with the user experience;

determining whether a threshold has been met resulting in the conclusion that there was a user experience of the specified instance of media content; and including at least a subset of the identified user demographic data in the set of interaction data.

17. The method of claim 16, wherein the determining includes utilizing a viewing requirement in the monitoring request.

18. The method of claim 16, wherein the determining includes experiencing a pre-determined percentage of the specified instance of media content in a normal play mode.

19. The method of claim 12, further comprising:

accessing a profile that includes demographic data associated with at least one of a user and a content processing device; and including at least a subset of the demographic data in the set of interaction data.

20. The method of claim 12, wherein the determining includes analyzing an input from a control device.

21. The method of claim 20, wherein an input from the control device includes data from a control device sensor.

22. A method, comprising: receiving a monitoring request specifying at least one instance of media content to monitor and a monitoring criterion, the specified instance of media content being identified by at least part of a media content identifier and wherein a decision to monitor the instance of media content is based on at least a portion of the media content identifier and based on a predefined geographic location associated with a user device; and wherein the content identifier includes a root, an episode and a version; and wherein the root identifies a specific advertiser and the episode represents a specific media instance; selecting a plurality of content processing devices based on the monitoring request; providing instructions to the selected content processing devices, instructing each content processing device to gather user interaction data, the instructions being based in part on the received monitoring request; and receiving user interaction data from at least a subset of the selected content processing devices.

23. The method of claim 22, wherein the monitoring criterion includes at least one of a demographic requirement, a demographic restriction, a viewing requirement, a time frame, a request to exclude live streaming media content, a fee limit, a location, and a media channel.

24. The method of claim 22, further comprising:

accessing a profile associated with at least one of a user and a content processing device, the profile including demographic data; and including at least a subset of the demographic data in the user interaction data.

25. The method of claim 22, further comprising analyzing the received user interaction data to determine which demographic groups of users experienced the instance of media content specified in the monitoring request.

26. The system of claim 1, wherein the content processing device is further configured to determine whether to exclude media content from monitoring.

27. The system of claim 26, wherein the content processing device is configured to determine whether to exclude media content from monitoring based at least in part on whether the transport stream is received live.

28. The system of claim 1, wherein the content identifier forming a portion of the transport stream by being associated with the instance of media content is selectively compared to a stored media content identifier.

29. The system of claim 1, wherein the transport stream incorporates at least one multiplexed signal.

30. The system of claim 29, wherein the multiplexed signal incorporates multiple multiplexed signals, including an audio signal and a data signal.

* * * * *